US 6,653,597 B2

(12) United States Patent
Baum

(10) Patent No.: US 6,653,597 B2
(45) Date of Patent: *Nov. 25, 2003

(54) APPARATUS AND METHOD FOR ELECTROMAGNETIC REMOVAL OF SPATTER FROM A NOZZLE OF AN ARC WELDING TORCH

(75) Inventor: Gary Baum, Dimondale, MI (US)

(73) Assignee: Weld-Aid Products, Inc., Detroit, MI (US)

(*) Notice: Subject to any disclaimer, the term of this patent is extended or adjusted under 35 U.S.C. 154(b) by 8 days.

This patent is subject to a terminal disclaimer.

(21) Appl. No.: 10/034,581

(22) Filed: Dec. 28, 2001

(65) Prior Publication Data

US 2002/0053561 A1 May 9, 2002

Related U.S. Application Data

(63) Continuation of application No. 09/628,615, filed on Jul. 31, 2000, now Pat. No. 6,335,513.

(51) Int. Cl.[7] .................................................. B23K 9/32
(52) U.S. Cl. .................................. 219/137.43; 219/136
(58) Field of Search ........................... 219/137.43, 136

(56) References Cited

U.S. PATENT DOCUMENTS 4,838,287 A    6/1989  Matsui et al.
6,335,513 B1 * 1/2002  Baum ................... 219/137.43

* cited by examiner

Primary Examiner—Clifford C. Shaw
(74) Attorney, Agent, or Firm—Howard & Howard

(57) ABSTRACT

An electromagnetic weld spatter removal device wherein a single control and power source may be utilized to fire multiple electromagnetic coils, thereby producing a cost savings. A first embodiment of the invention includes a contactor switch mechanism, a control mechanism, at least two contactors, and at least two electromagnetic coils for removing weld spatter.

There is also disclosed a method for removing weld spatter using multiple electromagnetic coils for multiple welding stations.

In a second embodiment there is disclosed a single enclosure housing the power supply, control logic board, at least two SCRs connected to at least two coils for the removal of weld spatter.

8 Claims, 2 Drawing Sheets

APPARATUS AND METHOD FOR ELECTROMAGNETIC REMOVAL OF SPATTER FROM A NOZZLE OF AN ARC WELDING TORCH

The present application is a continuation application of application Ser. No. 09/628,615 filed on Jul. 31, 2000, now U.S. Pat. No. 6,335,513.

BACKGROUND OF THE INVENTION

The present invention relates to an apparatus and method for removing spatter which has accumulated on the nozzle of an arc welding torch. More particularly, the present invention relates to an apparatus and method for removing spatter from an arc welding torch nozzle whereby a single control power unit and control logic may be used to operate multiple electromagnetic spatter removal devices.

Manufacturing operations employ various arc welding processes when creating a product. Typically, a welding electrode is placed near articles to be welded and an electrical arc is formed between the electrode and the articles, such that the articles temperature is locally raised to thereby cause the articles to melt and form a weld.

A particularly useful method of arc welding is that of a continuous electrode shielded by an inert gas. Utilizing such a technique, requires a nozzle be placed around the welding electrode, such that inert gas is directed towards the area to be welded. The shielding gas is needed to prevent the atmosphere from adversely affecting the weld. For example, the gas prevents unwanted oxidation of the parts, as well as maintains the physical properties of the welded area. When such a process is utilized, a common problem arises; weld spatter accumulates on the opening of the nozzle. Over time, this accumulation will become so great as to block the flow of shielding gas. When the flow of shielding gas is blocked, the mechanical properties of the weld will be adversely affected.

Various devices have been proposed to remove spatter from the nozzle of an arc welding torch. A method and device which has proven to be highly acceptable is the mechanism and method for electromagnetic removal of spatter on the nozzle of an arc welding torch. Such a device is denoted in U.S. Pat. No. 4,838,287, which is hereby incorporated by reference.

One detriment of electromagnetic spatter removal devices known at the present time is that the controller of the devices is configured to control only one device at a time. For each device, a control and a power supply is needed to charge the coil of the electromagnetic spatter removal device at the appropriate time.

It has been determined, however, that in facilities where multiple-welding stations exist, such as in many manufacturing and assembly plants, a significant amount of time can exist between the electromagnetic spatter removal of one torch nozzle at one station and the required electromagnetic spatter removal of another torch at another station. These stations may also be located in such a manner that the devices carrying the welding torch may not be able to reach a central location for spatter removal. Thus, it would be desirable to utilize a device that is capable of controlling multiple spatter removal devices utilizing a single power source, thereby reducing the number of power and control units necessary and thereby reduce the overall cost associated with the spatter removal process of the individual torch nozzles.

SUMMARY OF THE INVENTION

It is therefore, an object of the present invention to provide an apparatus and method whereby a single power and control unit may be utilized for firing multiple electromagnetic spatter removal devices.

In a first disclosed embodiment, a weld spatter removal device utilizes an existing power supply. The source of power is connected to a silicon control rectifier (SCR) which in turn is connected to a multiple contactor switch mechanism mounted in an enclosure. The multiple electromechanical contactor switch mechanism is utilized to selectively allow the passage of current to individual electromagnetic coils. The contactor switch mechanism is connected to at least two contactors, which in turn are connected to at least two electromagnetic coils, which are charged to remove weld spatter from the opening of the nozzle of an arc welding torch. A control mechanism is included in the enclosure and is utilized for the selection of the appropriate contactor to be energized. The selection is determined by input from the user or customer's welding cell controller or robot.

There is also disclosed a method for utilizing a single control and power source to control multiple weld spatter removal devices. The method includes the steps of: (1) providing a power supply connected to a SCR, (2) providing a contactor switch mechanism with at least two switches, (3) providing a control mechanism connected to the contactor switch mechanism, (4) Providing at least two electromagnetic coils connected to at least two electromechanical contactors, (5) energizing the first switch, (6) closing the first contactor, (7) energizing the power supply, (8) opening the first switch, (9) energizing another switch, (10) closing another contactor, (11) energizing the power supply (12) opening the switch just energized.

In a second embodiment, a weld spatter removal device utilizes an external source of power connected to a circuit breaker. A bridge rectifier is connected to the circuit breaker and a first resistor is connected to the bridge rectifier. A capacitor bank for storing a charge is connected to the first resistor. There is also a second resistor connected across the capacitor bank through a relay for discharging the capacitor bank when the power is turned off. The second embodiment also includes at least two silicon controlled rectifiers connected to the capacitor bank and at least two electromagnetic coils connected to the at least two silicon controlled rectifiers for generating a magnetic field to remove weld spatter from an arc welding nozzle. There is also a control logic board for receiving and generating control signals to regulate the energizing of the at least two electromagnetic coils.

These and other features of the present invention can best be understood from the following specification and drawings.

DETAILED DESCRIPTION OF THE PREFERRED EMBODIMENT

Figure 1:
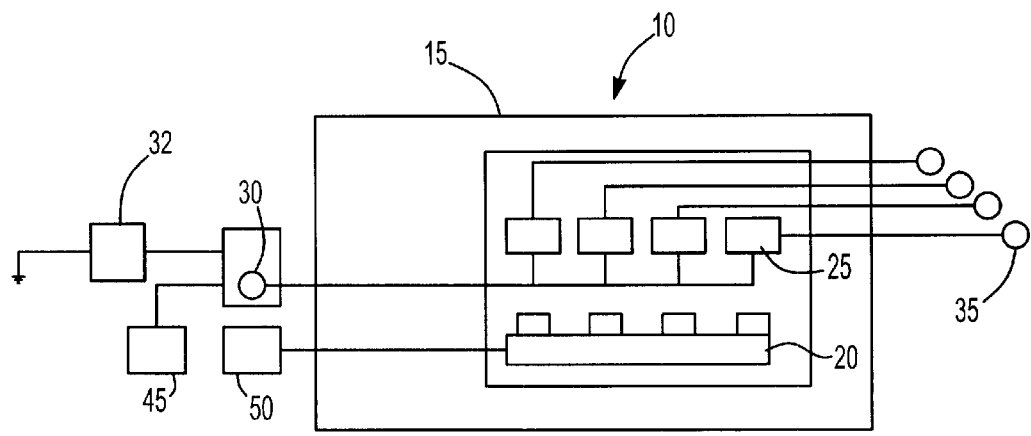
FIG. 1 is a block representation of a first embodiment of the present invention.

There is shown generally in FIGS. 1 at 10, the first embodiment of the weld spatter removal device of the present invention. The controlling circuitry of the invention is housed in an enclosure 15 to protect the circuitry from exposure to the external surroundings, as well as to provide a unitary module that may be easily installed by an end user.

Within the enclosure 15 are electromechanical contactor switches 20, and contactors 25. The first embodiment is designed to be an addition capable of integration into a single magnetic coil removal system. A single SCR 30, which may or may not be already installed is connected to an existing power supply 32 and capacitor (not shown). The SCR is also connected to the contactor switches 20. The switches are in turn connected to the contactors 25. The contactors 25 are connected to electromagnetic coils 35 which are energized to remove weld spatter from the opening of a weld torch nozzle.

There is also included in the first embodiment of the present invention a control 40 that selects the appropriate contactor 25 to be energized, which in turn energizes a corresponding electromagnetic coil 35. The control may be from an enduser's robot 45 or from the enduser's welding cell controller 50. The control signal is preferably a 24 volt signal that is compatible with most industrial welding operations, but may be of a different variety without departing from the invention.

As shown in FIG. 1, there are four contactor switches 20, four contactors 25 and four electromagnetic coils 35 connected to each other in an appropriate manner to service a corresponding number of welding stations. It is to be understood that an alternative number may be utilized by the present invention, such as, two or three. It has been determined that at numbers greater than four stations, the longevity of the capacitor decreases and the need for a faster and more complicated energizing control 40 outweighs the benefits associated with using multiple firing weld spatter removal devices. The distance the current may travel due to the resistance of a wire is also a limiting factor as to the number of electromagnetic coils that may be used. As a matter of prudent manufacturing, it has been also determined that a numbers greater than four weld spatter removal stations, a failure in the process could cause the shut down of a large portion of a manufacturing operation, leading to a significant loss of money.

Figure 2:
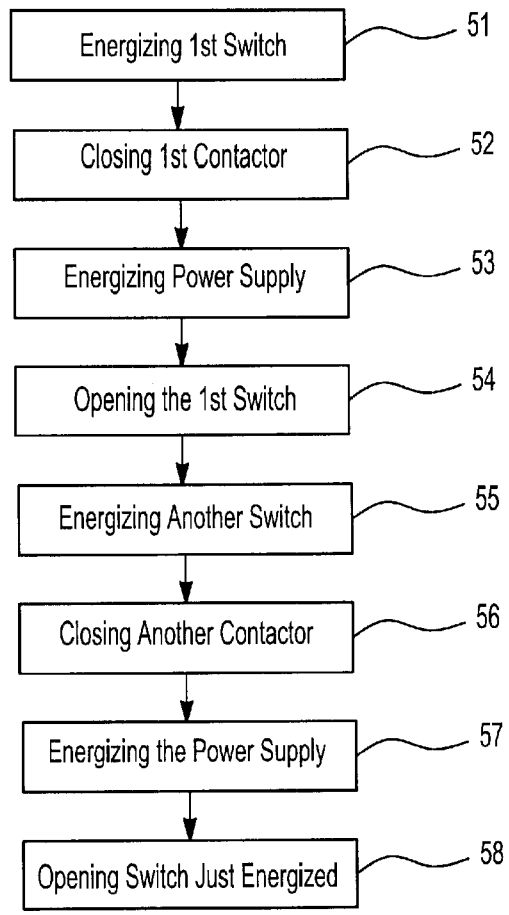
FIG. 2 is a block diagram representing the method of the first embodiment of the present invention.

With reference to FIG. 2, there is shown a block diagram disclosing a method for utilizing a single control and power source.

The method utilized provides a cost-efficient method of operation as large, expensive switches are not necessary to route the power to the various electromagnetic coils, as the current is sent to the SCR through a closed contactor, which only requires a small switch that is relatively inexpensive. The method as disclosed by the block diagram in FIG. 3, will be described in terms of two switches, even if there are four switches utilized by the process, as only one coil can be fired at any one time; therefore, a first switch and another, representing one of either switch two, three or four will be used in the description.

As detailed in S1, a first switch is energized, then as detailed in S2 the first contactor is closed. Next, the power supply is energized as shown in S3. The first switch is then opened as representative of S4. Another switch is then energized as in S5 and another contactor is closed as in S6. The power supply is then energized as in S7 and the switch energized in S5 is opened as depicted in S8.

Utilizing this method a large switch is not required as the SCR is fired through a closed contactor, and the invention includes a contactor for each electromagnetic coil; therefore, a break does not occur when the contactor is under power, thus not requiring a large switch.

Figure 3:
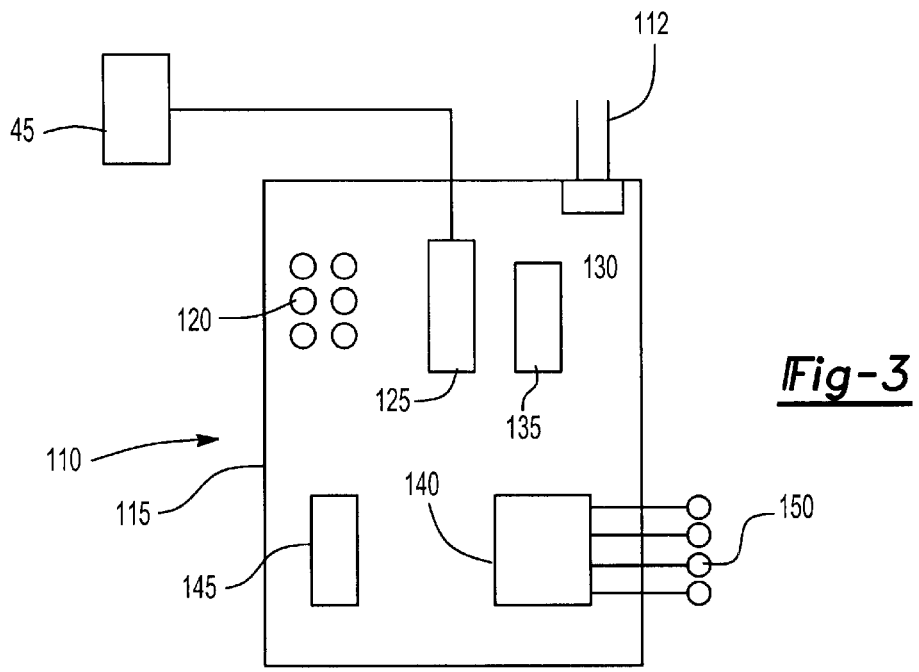
FIG. 3 is a block representation of a second embodiment of the present invention.

With reference to FIG. 3, there is shown generally in at 110, a second embodiment of the weld spatter removal device of the present invention. The controlling circuitry of the present invention is housed in an enclosure 115 to protect the circuitry from exposure to the external surroundings, as well as to provide a unitary module that may be easily installed by an end user.

Within the enclosure 115 is contained a capacitor bank 120, a firing circuit 125, a circuit breaker 130, a charger circuit 135, a SCR firing section 140 and a fan 145. The enclosure is connected to an external source of power 112 and to electromagnetic coils 150 provided at welding stations for the removal of weld spatter.

Figure 4:
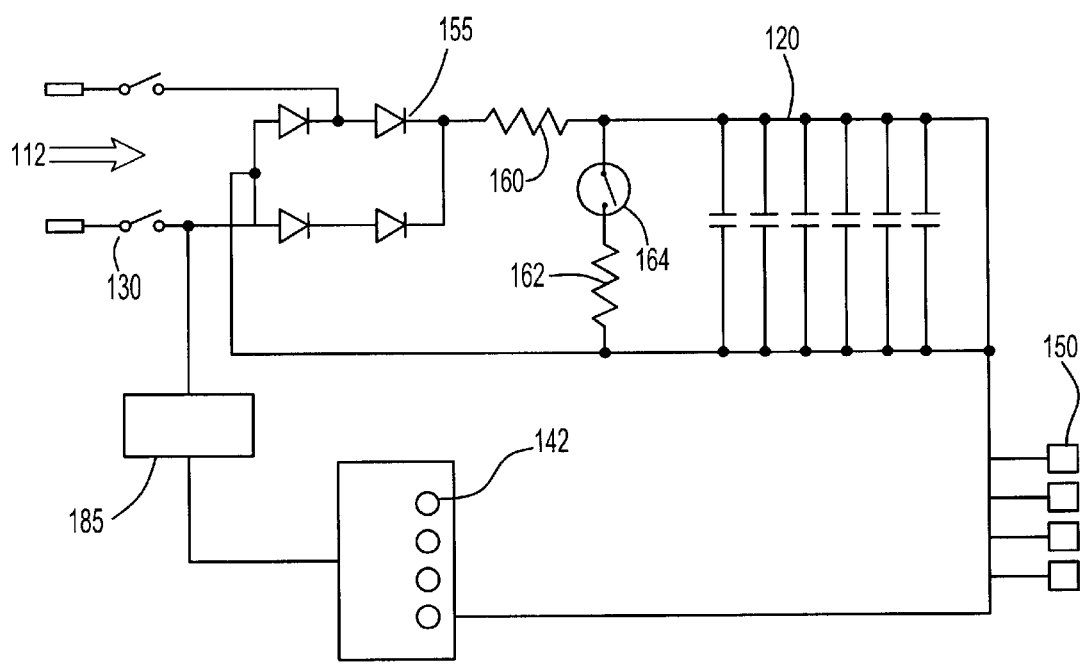
FIG. 4 is a schematic representation of the circuitry of the second embodiment of the present invention.

With reference to FIG. 4, there is shown a schematic representation of the circuitry of the second embodiment of the present invention.

There is represented at 112, a source of power of 220 volts alternating current connected to a circuit breaker 130 for preventing short circuits or overloads. The 220 volt alternating current 112 is converted to approximately 310 volts direct current utilizing a bridge rectifier, as shown at 155. Although the current embodiment of the present invention utilizes a bridge rectifier rated at 600 volts, other voltage rectifiers may be used by the present invention.

A 125 ohm, 200 watt resistor shown at 160 is used to limit the charging current into the capacitor bank 120. A second 250 ohm, 100 watt resistor 162 is connected across the capacitor bank 120 through the normally closed contacts of a relay 164. The coil of the relay 164 is connected across the 220 volt alternating current 112 line after the circuit breaker 130 such that when the circuit breaker 130 closes, the relay contacts pick. When the power is switched off, the relay 164 contacts return to their normally closed configuration and discharge the capacitor bank 120 through the second resistor 162 which is rated at 250 ohms and 100 watts. The second resistor; therefore, acts as a safety mechanism to prevent accidental shocks from occurring due to a charge stored in the capacitor bank 120 when the power is shut off. Again, the preferred embodiment of the present invention utilizes a 125 ohm, 200 watt resistor and a 250 ohm, 100 watt resistor; is to be understood that other configurations may be utilized by the present invention dependent on the required charging specifications of the capacitor bank 120, as well as the discharge time necessary when the power is turned off.

The capacitor bank 120 charges to approximately 310 volts direct current after power is applied. The capacitor bank 120 then remains charged until one of the four SCRs 142 is fired, thereby causing the SCR 142 to be discharged through one of the four electromagnetic coils 150. The electromagnetic coils are utilized to produce a magnetic field and thereby remove weld spatter from the opening of an arc welding torch nozzle.

The SCRs are triggered by a series of electrical pulses generated by a control power source 185. The series of pulses is coupled between the SCR cathode and gate by the secondary of a trigger transformer. The primary of the trigger transformer is driven by an open collector transistor which is, in turn, driven by a series of logic gates. When a "true low" electrical signal is received by the SCR trigger logic board 125 from an outside electrical source, the logic board creates a 30 kHz pulse stream that is gated into the base of the transistor for about 10 milliseconds. The pulse stream is responsible for triggering the SCRs "on". Once the capacitor bank is fully discharged, the collapse of the magnetic field in the electromagnetic coil 150 serves to turn the SCR "off".

The discharge time constant of the capacitor bank is determined by the size of the capacitors 120 utilized, as well as, the size of the electromagnetic coil 150 or inductor utilized. In a preferred embodiment, the capacitor bank is filly discharged into the coil from between 10 and 13 milliseconds.

The control mechanism of the second embodiment of the present invention includes control and logic values that are entered by an enduser, as to the number of weld stations being serviced, as well as the frequency in which a weld nozzle needs to be cleaned.

As shown in FIGS. 3 and 4, there are four SCRs 142 and four electromagnetic coils 150. As with the first embodiment, is to be understood that an alternative number may be utilized by the present invention, such as, two or three. Again, the reasoning for limiting the first embodiment to four electromagnetic coils applies to the second embodiment as well.

While preferred embodiments and methods are disclosed, a worker in this art would understand that various modifications would come within the scope of the invention. Thus the following claims should be studied to determine the true scope and content of this invention.

What is claimed is:

1. A weld spatter removal device comprising:

an existing source of power connected to a compact electrical switching device;

a multiple contactor switch mechanism connected to said compact electrical switching device;

a control mechanism connected to said multiple contactor switch mechanism for selectively allowing passage of current;

at least two contactors connected to said multiple contactor switch mechanism;

at least two electromagnetic coils connected to the at least two contactors for removing weld spatter from an arc welding torch nozzle; and said existing source of power providing power for said at least two electromagnetic coils, whereby said control mechanism selectively energizes only one of the at least two electromagnetic coils to remove weld spatter from said arc welding torch nozzle.

2. A weld spatter removal device comprising:

an existing source of power connected to a compact device to allow discharge of an electric current through a selected route;

a multiple contactor switch mechanism connected to the compact device to allow discharge of an electric current through a selected route;

a control mechanism connected to said multiple contactor switch mechanism for selectively allowing passage of current;

at least two contactors connected to said multiple contactor switch mechanism;

at least two electromagnetic coils connected to the at least two contactors for removing weld spatter from an arc welding torch nozzle; and said existing source of power providing power for said at least two electromagnetic coils, whereby said control mechanism selectively energizes only one of the at least two electromagnetic coils to remove weld spatter from said arc welding torch nozzle.

3. A weld spatter removal device for controllably connecting a power source of a plurality of electromagnetic coils for removing weld spatter from a welding torch nozzle, comprising:

a multiple contactor switch mechanism connected to compact electrical switching device; and, a control mechanism connected to said multiple contactor switch mechanism for selectively allowing passage of current for selectively energizing only one of the at least two electromagnetic coils.

4. A weld spatter removal device, as set forth in claim 3, further comprising at least two contactors connected to said multiple contactor switch mechanism.

5. A weld spatter removal device for controllably connecting a power source to one of a plurality of electromagnetic coils for removing weld spatter from a welding torch nozzle, comprising:

a compact device coupled to the electromagnetic coils to allow discharge of an electric current through a first selected route;

a multiple contactor switch mechanism connected to the compact device to allow discharge of an electric current through a second selected route; and, a control mechanism connected to said multiple contactor switch mechanism for selectively allowing passage of current and for selectively energizing only one of the at least two electromagnetic coils to remove weld spatter from said arc welding torch nozzle.

6. A weld spatter removal device, as set forth in claim 5, further comprising at least two contactors connected to said multiple contactor switch mechanism.

7. A method for controllably connecting a power supply to one of a plurality of electromagnetic coils for removing weld spatter from an arc welding torch nozzle, the power supply being coupled to an electronic switch, the electronic switch being coupled to a multiple contactor switch mechanism, the multiple contactor switch mechanism include at least first and second switches, first and second contactors being coupled between the first and second switches, respectively, and a respective electromagnetic coils, the method including the steps of:

closing the first switch;

energizing the first contactor;

energizing the power supply to energize the respective electromagnetic coil; and opening the first switch.

8. A method, as set forth in claim 7, further including the steps of closing the second switch;

energizing the second contactor; and, energizing the power supply to energize the respective electromagnetic coil.

* * * * *

UNITED STATES PATENT AND TRADEMARK OFFICE
CERTIFICATE OF CORRECTION

PATENT NO.     : 6,653,597 B2
DATED          : November 25, 2003
INVENTOR(S)    : Gary Baum It is certified that error appears in the above-identified patent and that said Letters Patent is hereby corrected as shown below:

<u>Column 6,</u>
Line 7, after "power source" insert therein -- to one --.
Line 10, after "connected to" insert therein -- a --.

Signed and Sealed this

Twenty-fourth Day of February, 2004

JON W. DUDAS
*Acting Director of the United States Patent and Trademark Office*